United States Patent [19]

Twardowska et al.

[11] Patent Number: 5,474,606

[45] Date of Patent: Dec. 12, 1995

[54] HEAT CURABLE FOUNDRY BINDER SYSTEMS

[75] Inventors: Helena J. Twardowska, Burnaby, Canada; Heimo J. Langer, Columbus, Ohio

[73] Assignee: Ashland Inc., Columbus, Ohio

[21] Appl. No.: 217,919

[22] Filed: Mar. 25, 1994

[51] Int. Cl.⁶ .............................. C04B 12/04; B28B 7/00
[52] U.S. Cl. .................. 106/632; 106/600; 106/634; 106/38.3; 106/38.9; 264/319; 264/239; 264/299
[58] Field of Search .................. 106/38.3, 38.9, 106/632, 634, 600; 264/319, 239, 299; 164/47

[56] References Cited

U.S. PATENT DOCUMENTS

| | | | |
|---|---|---|---|
| 2,239,358 | 4/1941 | Vail et al. | 106/632 |
| 3,804,643 | 4/1974 | Arita et al. | 106/38.3 |
| 3,950,470 | 4/1976 | Davidovits | 264/113 |
| 4,028,454 | 6/1977 | Davidovits et al. | 264/82 |
| 4,162,238 | 7/1979 | Bergna | 106/632 |
| 4,349,386 | 9/1982 | Davidovits | 106/85 |
| 4,472,199 | 9/1984 | Davidovits | 106/85 |
| 4,509,985 | 4/1985 | Davidovits et al. | 106/84 |
| 4,642,137 | 2/1987 | Heitzmann et al. | 106/85 |
| 5,244,726 | 9/1993 | Laney et al. | 106/632 |

FOREIGN PATENT DOCUMENTS 924252  7/1993  Finland ........................... B22C 1/18

OTHER PUBLICATIONS

J. Davidovits, Geopolymers, Inorganic Polymeric New Materials, Journal of Thermal Analysis, vol. 37 (1991) 1633–1656.

*Primary Examiner*—Mark L. Bell
*Assistant Examiner*—Michael Marcheschi
*Attorney, Agent, or Firm*—David L. Hedden

[57] ABSTRACT

This invention relates to heat curable foundry binder systems comprising as separate components (a) a caustic solution of an alkali silicate and (b) hydrated aluminum silicate. The solution is mixed with sand to form a foundry mix. The resulting foundry mix is shaped and heated at an elevated temperature to form a cured foundry shape. Heat is applied by warm air, baking in an oven, microwave, or preferably from hot-box equipment.

12 Claims, No Drawings

HEAT CURABLE FOUNDRY BINDER SYSTEMS

FIELD OF THE INVENTION

This invention relates to heat curable foundry binder systems comprising as separate components (a) a caustic solution of an alkali silicate and (b) hydrated aluminum silicate. The binder components are mixed with sand to form a foundry mix. The resulting foundry mix is shaped and heated at an elevated temperature to form a cured foundry shape. Heat is applied by warm air, baking in an oven, microwave, or preferably by hot-box equipment.

BACKGROUND OF THE INVENTION

U.S. Pat. No. 4,349,386 discloses mineral polymers called (sodium, potassium) polysialatesiloxo (referred to as NaKPSS in the patent) having the structural formula:

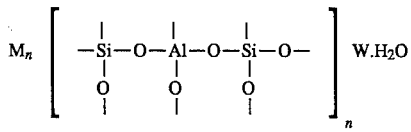

where M is sodium or sodium plus potassium, n is the degree of polycondensation, and w has a value up to about 7. In order to form these NaKPSS polymers, anhydrous aluminum silicate and a mixture of strong alkali and alkali silicate are mixed in two stages. In the first stage, the reactant mixture is allowed to react at ambient temperature for at least an hour to form a viscous "mineral resin". See column 3, line 65 to column 4, line 2. In the second stage, the "mineral resin" is heated continuously or in stages at temperatures of about 25° C. to 120° C. for about 0.5 to 15 hours, depending upon the temperature of condensation, to further cure the mineral resin. See column 4, lines 13–25.

The patent indicates that the anhydrous aluminum silicate which is mixed with caustic and alkali silicate to form the mineral resin is prepared by calcining polyhydroxy-alumino-silicate (hydrated aluminum silicate) at temperatures of, for example, 550° C. to 600° C. to remove the water of hydration. See column 3, lines 20–24.

Example 3 of the patent discloses the use of a mineral resin, i.e. the partially cured polymers formed in the first stage by reacting at ambient temperature, to make a foundry mix. The patent indicates that the mineral resin is mixed with sand and allowed to further cure for several hours at ambient temperature or for approximately 1.5 hours at 85° C.

In view of this data, it is clear that these polymers and this process are not practical to use in high production core and mold making processes under these conditions. In addition to their low strength and long setting time, these polymers, when used as foundry binders, have poor humidity resistance and require a high binder level (up to 6 to 7 weight percent based upon the weight of the sand) for effective use. Because of these deficiencies, foundry binders based upon these polymers are impractical to use for high production, heat-cured foundry applications.

SUMMARY OF THE INVENTION

The subject invention relates to heat curable foundry binder systems comprising as separate components:

(1) a caustic solution of an alkali silicate, and (2) hydrated aluminum silicate, such that the weight percent of (1) in the binder system ranges from about 60 to about 85 weight percent, and the weight percent of (2) is from about 15 to about 40 weight percent, said weight percents being based upon the total weight of the binder.

The binder system is mixed with a foundry aggregate to form a foundry mix. The resulting foundry mix is shaped and cured by heating in one continuous stage with warm air, baking in oven, microwave, and preferably in hot-box equipment.

In contrast to the NaKPSS polymers of U.S. Pat. No. 4,349,386 which are made with anhydrous aluminum silicate, the binder systems of the subject invention are made with hydrated aluminum silicate. According to the subject process, no intermediate "mineral resin" is formed. Instead the binder systems, which comprise a mixture of caustic solution of an alkali silicate and hydrated aluminum silicate, are applied to the foundry aggregate as individual components rather than as a mineral resin. However, polymerization of the binder system does not occur when the components are mixed with a foundry aggregate and shaped, but instead occurs when the shaped foundry mix is heated to temperatures of at least 200° C. to 300° C., preferably 200° C. to 275° C., most preferably 230° C. to 260° C.

Since the foundry mixes prepared with the subject binder systems do not substantially polymerize until heated, they have a benchlife of up to five hours. On the other hand, the foundry mixes prepared with the binders disclosed in U.S. Pat. No. 4,349,386 have a short benchlife because they undergo reaction at ambient temperature to form mineral resins.

Foundry mixes are prepared by mixing the binder components with a foundry aggregate. The foundry mixes are shaped into molds, cores, and assemblies thereof. In contrast to the foundry shapes made with the binders described in U.S. Pat. No. 4,349,386 which are made with anhydrous aluminum silicate, the subject binders made with hydrated aluminum silicate provide cured foundry shapes which set quickly at elevated temperatures, have good tensile strengths, do not require excess free alkali (which is disadvantageous for reclamation and shakeout), show good humidity resistance, are used in commercially acceptable binder levels (generally less than about 5 weight percent based upon the weight of the aggregate). Additionally, since commercial grades of aluminum silicate containing water of hydration can be used as they are without calcining at temperatures of 550° C. to 650° C. to remove the water of hydration, costs are reduced.

ENABLING DISCLOSURE AND BEST MODE

The binder system comprises two components: (1) a caustic solution of alkali silicate, and (2) hydrated aluminum silicate. Component (1) is liquid while component (2) is a powder.

The caustic solution of alkali silicate, preferably sodium silicate, is typically formed by mixing (a) from about 70 weight percent to 95 weight percent of an aqueous sodium silicate solution, (b) from about 5 weight percent to about 15 weight percent caustic, preferably as a 50 weight percent of alkali hydroxide (preferably sodium hydroxide) in water, and (c) from 0 weight percent to 20 weight percent of additional water to insure adequate viscosity of the caustic and alkali silicate solution.

Preferably used as the caustic solution of alkali silicate is from about 80 weight percent to 95 weight percent of aqueous sodium silicate solution, from about 10 weight percent to 15 weight percent caustic as a 50% weight percent of sodium hydroxide, and from about 0 to about 10 weight percent of water, said weight percents being based upon the total weight percent of the caustic solution of sodium silicate. Preferably the aqueous sodium silicate solution comprises sodium silicate in water in the amount of from about 35 weight percent to about 45 weight percent, wherein said weight percents are based upon the total weight of the aqueous solution of sodium silicate.

As used herein, hydrated aluminum silicate means aluminum silicate which is hydrated with water. Preferably used as the hydrated aluminum silicate is kaolinite which is $Al_2O_3 \cdot 2SiO_2 \cdot 2H_2O$. The hydrated aluminum silicate typically contains water of hydration in the amount of from 1 to 2 moles of water per mole of aluminum silicate, preferably 2 moles of water per mole of aluminum silicate. The particle size of the hydrated aluminum silicate is as low as possible, preferably lower than 0.5 micron.

Preferably the molar ratio of $Na_2O:Al_2O_3$ in the binder is from 0.7:1.0 to 1.5:1.0, the molar ratio of $Na_2O:SiO_2$ in the binder is from 0.2:1.0 to 0.3:1:0, and the molar ratio of $SiO_2:Al_2O_3$ in the binder is from 3.5:1.0 to 5.8:1.0. Most preferably the molar ratio of $Na_2O:Al_2O_3$ in the binder is from 1.1:1.0 to 0.9:1.0, the molar ratio of $Na_2O:SiO_2$ in the binder is from 0.2:1.0 to 0.3:1:0, and the molar ratio of $SiO_2:Al_2O_3$ in the binder is from 4.0:1.0 to 5.5:1.0.

Although the binder components can be premixed with each other before mixing them with the aggregate, it is preferred to mix the caustic solution of sodium silicate first with the aggregate and then mix the hydrated aluminum silicate. Alternatively, the hydrated aluminum silicate can be first mixed with the aggregate.

Preferably, polyvinyl acetate (PVA) is added to the hydrated aluminum silicate to eliminate or reduce penetration in the finished casting. The polyvinyl acetate is preferably added to hydrated aluminum silicate in the amount of about 5 weight percent to about 25 weight percent based upon the weight of hydrated aluminum silicate, preferably about 15 weight percent to 20 weight percent.

Optional substances, for example, urea, cellulose, citric acid, rubber lattices, cement, carbon/graphite, etc. may also be added to the foundry binder systems. Those skilled in the art of formulating foundry binders will know what substances to select for various properties and they will know how much to use of these substances and whether they are best mixed into the binder.

The binder forming solution is mixed with sand at effective binding amounts, which amounts to levels of 1 weight percent to 10 weight percent based upon the weight of the aggregate, preferably at levels of 1 weight percent to 5 weight percent. The aggregate used to prepare the foundry mixes is that typically used in the foundry industry for such purposes or any aggregate that will work for such purposes.

Generally, the aggregate will be sand which contains at least 70 percent by weight silica. Other suitable aggregate materials include zircon, olivine, alumina-silicate sand, chromite sand, and the like.

The aggregate is used in a major amount. In this context, major amount is an amount go at least 80 weight percent based upon the total weight of the foundry mix which includes the aggregate and binder, preferably at least 90 weight percent.

The sand mixture is compacted into cores and/or molds to form foundry shapes and heated to temperatures of at least 200° C. to 300° C., preferably 200° C. to 275° C., most preferably 230° C. to 260° C. until the foundry shapes can be handled without breaking, typically for 30 seconds to 2 minutes. Heating time is a function of the temperature and the heating process used. The heat source may be from the warm air, baking in a conventional oven, microwave, or preferably from hot-box equipment.

Foundry shapes prepared with the binder forming solution made with hydrated aluminum silicate exhibit adequate immediate strengths for handling and show added strength development during 24 hours after curing. The heat cured foundry shapes also exhibit excellent humidity resistance, much better than the foundry shapes made with the binders using anhydrous aluminum silicate shown in U.S. Pat. No. 4,349,386.

The following abbreviations are used in the Examples and Tables which follow:
BOS=based on sand
CH=constant humidity
CT=constant temperature
DT=dwell time (seconds)
KAOP AB=hydrated aluminum silicate, having an medium particle size of about 0.3 micron (i.e. typically more than fifty percent of the particles have this particle size) sold under the tradename KAOPOLITE AB
KAOP 1152=anhydrous aluminum silicate made by calcining hydrated aluminum silicate at a temperature believed to be from about 600° C. to 700° C. and sold under the tradename KAOPOLITE 1152
SODSILSOL=a solution of sodium silicate in sodium hydroxide comprising $Na_2SiO_3$ with a weight ratio of $SiO_2$ to $Na_2O$ of 3.22 wherein said sodium silicate is mixed with 12 molal NaOH such that the weight ratio of $Na_2SiO_3$ solution to NaOH solution 82:18
PVA=polyvinyl acetate (sold as AIRFLEX RP-245 by Air Products) room humidity
RT=room temperature
VEINSEAL=VEINSEAL 11,000 additive, sold by National Gypsum and composed mostly of iron oxide along with minor amounts of dextrin and clay, which is used to reduce core penetration into the metal among other things Sand mixes were prepared by mixing the binder components and Wedron 540 Sand in a Hobart N-50 Mixer. The sand mixes were made into the shape of dogbones for tensile strength measurements with a Thwing-Albert TA 500. The dogbone shapes were cured by heating them in hot-box equipment. The temperature of the heated core box, sand type, and the blow time are shown in the tables.

Tensile strengths of the dogbone shapes were measured immediately, 1 hour, and 24 hours after removing them from the core box. Humidity resistance was tested by using dogbone shapes 24 hours after removing them from the core box. These dogbone shapes were placed in a humidity chamber at 25° C. and 99% relative humidity (RH) for 1 hr. The test conditions and the results are summarized in the tables.

Metal castings made with the binders showed excellent resistance against erosion and veining while penetration and surface finish were good. Shakeout for aluminum castings was on the average about 45 seconds.

All of the Examples in Table I are Controls because they are carried out at either room temperature or 85° C. Controls A and B use a binder made with anhydrous aluminum silicate which is within the scope of Example 3 of U.S. Pat. No. 4,349,386. Controls AA and BB in Table I show a binder made with hydrated aluminum silicate. The foundry shapes made according to the conditions in Table I are allowed to cure at room temperature and at 85° C., substantially in the manner as disclosed in U.S. Pat. No. 4,349,386.

The data in Table I indicate that neither the binder made in accordance with U.S. Pat. No. 4,349,386 nor the binder made with hydrated aluminum silicate produced cores at room temperature or 85° C. are useful for high production because of the time it takes and the cores poor resistance to humidity.

Table III which follows shows the effect of mixing Part I and Part II of the binder system together before mixing it with the aggregate. Although not as effective as mixing the Part I with the aggregate first before adding the Part II, the premix approach does work. Comparison D indicates that a binder using anhydrous aluminum silicate prepared in accordance with U.S. Pat. No. 4,349,386 does not cure effectively at a temperature of 232° C.

TABLE I

COMPARISON OF BINDERS MADE WITH HYDRATED AND ANHYDROUS ALUMINUM SILICATE

Sand Lab: 23° C., 39% RH
CT/CH Room: 25° C., 50% AH
Sand: Wedron 540, 3.0 kg.
Part I: 3.5% BOS SODSILSOL
Part II: 1.5% BOS see below
Binder Level: 5.0% BOS

| | Curing | | | Tensile Strengths (PSI) | | | | |
|---|---|---|---|---|---|---|---|---|
| | Conditions | | | | | | | 24 + 1 |
| Example | Temp. | Time | Part II | Imm. | 1 Hr. | 3 Hrs. | 24 Hrs. | Hrs. |
| A | R.T. | 15 h | KAOP 1152 | 33 | 49 | 60 | 240 | 51 |
| AA | R.T. | 15 h | KAOP AB | 4 | 31 | 48 | 336 | 91 |
| B | 85° C. | 1.5 h | KAOP 1152 | 196 | 222 | 229 | 206 | 21 |
| BB | 85° C. | 1.5 h | KAOP AB | 341 | 412 | 414 | 418 | 39 |

Table II shows the effect of using binders made from hydrated aluminum silicate and anhydrous silicate at curing temperatures of 232° C. Clearly, the binder prepared with the hydrated aluminum silicate is superior. The binders made with the hydrated aluminum silicate can be used for high production, heat cured, core and mold making processes.

The cores made with the binder containing calcined (anhydrous) aluminum silicate have no immediate tensile strength and cannot be removed from the core box. The reason for this is because the anhydrous aluminum silicate does not have water of hydration, and any free water from solution is removed very quickly under hot-box conditions, resulting in very little strength development. On the other hand, water of hydration in hydrated aluminum silicate is available for polycondensation, resulting in quicker and adequate tensile strength development.

TABLE II

COMPARISON OF BINDERS USING HYDRATED AND ANHYDROUS ALUMINUM SILICATE CURED AT TEMPERATURES OF 232° C.

Test Conditions
Sand Lab: 21° C., 34% RH
CT Room: 25° C., 50% RH
Sand: Wedron 540, 4.0 kg.
Part I: 2.45% BOS
Part II: 1.05% BOS
0.5 second blow time @ 60 psi
232° C. box temperature

| | | | Dwell Times | TENSILE STRENGTHS (PSI) | | | |
|---|---|---|---|---|---|---|---|
| Example | Part I | Part II | (Seconds) | Immediate | 1 Hour | 24 Hours | 24 + 1 Hours |
| 1 | SODSILSOL | KAOP AB (Hydrated) | 50 | 48 | 302 | 250 | 166 |
| 2 | SODSILSOL | KAOP 1152 (Anhydrous) | 50 | | NO STRENGTHS | | |

TABLE III

COMPARISON OF ONE PART BINDER SYSTEM AND TWO PART BINDER SYSTEM WHICH USE HYDRATED ALUMINUM SILICATE

| Test Conditions | | Ex. | Part 1 |
|---|---|---|---|
| Sand Lab: | 21° C., 34% RH | 2 | 2.45% BOS SODSILSOL |
| CT Room: | 25° C., 50% AH | 3 | 2.45% BOS SODSILSOL mixed with 1.05% BOS KAOP AB hydrated |
| Sand: | Wedron 540, 4.0 kg. | 4 | 3.50% BOS SODSILSOL mixed with 1.50% BOS KAOP AB hydrated |
| | | D | 3.50% BOS SODSILSOL mixed with 1.50% BOS KAOP 1152 (anhydrous) |

0.5 second blow time @ 60 psi
232° C. box temperature
Part II - In examples 3, 4, and D, the aluminum silicate (ALS) was added to the Part I before mixing with sand.

| | Part I | Part II | Dwell Times | TENSILE STRENGTHS (PSI) | | | |
|---|---|---|---|---|---|---|---|
| Example | % BOS | % BOS | (Seconds) | Immediate | 1 Hour | 24 Hours | 24 + 1 Hours |
| 2 | 2.45 | 1.05 (Hydrated KAOP AB) | 50 | 48 | 302 | 250 | 166 |
| 3 | 3.50 (Contains KAOP AB) | 0 | 50 | 46 | 244 | 192 | 146 |
| 4 | 5.00 (Contains KAOP AB) | 0 | 50 | 55 | 356 | 354 | 251 |
| D | 5.00 (Contains KAOP 1152) | 0 | 50 | NO STRENGTH | | | |

Table IV shows the effect of varying the molar ratio of $Na_2O:Al_2O_3:SiO_2$. The data indicate that the ratio of 1.3:1.0:5.5 is preferred over the ratio of 1.0:1.0:4.0, particularly for tensile strengths measured 24 hours and 24+ 1 Hours at 100% relative humidity after removal from the core box.

II was 0.25 weight percent based on the sand.

TABLE IV

THE EFFECT OF THE $Na_2O:Al_2O_3:SiO_2$ MOLAR RATIO ON THE HOT BOX SAND TEST PERFORMANCE OF BINDERS MADE WITH HYDRATED ALUMINUM SILICATE TENSILE STRENGTHS

| Test Conditions | | Ex. | Part I | Part II |
|---|---|---|---|---|
| Sand Lab: 21° C., 61% RH | | 5 | SODSILSOL | KAOP AB |
| CT/CH Rm: 25° C., 50% RH | | 6 | SODSILSOL[1] | KAOP AB |
| Sand: Wedron 540, 4.0 kg. | | | | |

0.5 second blow time @ 60 psi
See below for dwell times
232° C. box temperature

| Example | Part I % BOS | Part II % BOS | $Na_2O:Al_2O_3:SiO$ Molar Ratio | Dwell Times (Sec.) | TENSILE STRENGTHS (PSI) | | | |
|---|---|---|---|---|---|---|---|---|
| | | | | | Immediate | 1 Hour | 24 Hours | 24 + 1 Hours |
| 5 | 2.45 | 1.05 | 1.0:1.0:4.0 | 50 | 50 | 296 | 246 | 178 |
| 6 | 2.62 | 0.87 | 1.3:1.0:5.5 | 50 | 48 | 296 | 284 | 261 |

[1]The ratio of sodium silicate to sodium hydroxide was 91:9 instead of 82:18.

Table V shows that the addition of VEINSEAL and PVA improve the overall tensile strengths of foundry shapes made with the binders. The amount of additive admixed with Part

TABLE V

THE EFFECT OF ADDITIVES ON THE HOT BOX PERFORMANCE OF BINDERG MADE WITH HYDRATED ALUMINUM SILICATE TENSILE STRENGTHS

| Test Conditions | Ex. | Part I (2.45 weight % bos) | Part II | (Weight % bos) |
|---|---|---|---|---|
| Sand: Wedron 540, 4.0 kg. | 7 | SODSILSOL | KAOP AB | 1.05 |
| Part I: 2.45% BOS | 8 | SODSILSOL | VEINSEAL + KAOP AB | 1.30 |
| Mixer: Hobart N-50 | 9 | SODSILSOL | PVA + KAOP AB | 1.30 |

0.5 second blow time @ 60 psi
See below for dwell times
232° C. box temperature

| Example | Dwell Times (Seconds) | TENSILE STRENGTHS (PSI) | | | |
|---|---|---|---|---|---|
| | | Immediate | 1 Hour | 24 Hours | 24 + 1 Hours |
| 6 (no additive) | 50 | 48 | 294 | 217 | 157 |
| 7 (VEINSEAL added) | 50 | 52 | 311 | 288 | 219 |
| 8 (PVA added) | 50 | 46 | 296 | 264 | 181 |

Metal castings from grey iron poured at 1500° C. were made using 2"×2" test cores made from the sand mixes described in Examples 6 and 8 to determine the effect of using polyvinyl acetate in the sand mix on the penetration of metal into the core or mold. Penetration occurs when the pressure of molten metal is high enough to force the molten metal into the interstices of a mold or core surface. The result is that occlusions are found on the cooled casting. These occlusions are formed because the molten metal mixes with the sand of the core and/or mold during pouring. These occlusions on the casting are difficult and costly to remove from the casting by grinding room operations.

Penetration was measured according to the penetration 2"×2" test casting described in by W. L. Tordoff et al. in *AFS Transactions*, "Test Casting Evaluation of Chemical Binder Systems" Vol 80-74, p 155 (1980), which is hereby incorporated by reference. The results of the penetration test indicated that the casting made with the sand mix of Example 6 (no PVA) showed only fair resistance to penetration while the casting made with the sand mix of Example 8 (contained PVA) showed excellent resistance to penetration.

Veining and erosion were also measured in the castings made with the sand mix of Example 6 (no PVA) and the casting made with the sand mix of Example 8 (contained PVA), but no significant differences were observed with respect to veining and erosion. Both veining and erosion resistance were excellent.

We claim:

1. A heat-curable foundry mix comprising a major amount of an aggregate and the balance a binder solution formed from a mixture of (a) about 60–85 weight percent of a caustic solution of an alkali silicate and (b) about 15 to about 40 weight percent of a hydrated aluminum silicate, said weight percents being based upon the total weight of the binder solution.

2. The foundry mix of claim 1 wherein the caustic alkali silicate solution comprises (a) 80 to 95 weight percent of an aqueous sodium silicate solution, said aqueous sodium silicate solution comprises from 35 to 45 weight percent sodium silicate, said weight percent being based upon the total weight of the aqueous sodium silicate solution and (b) 5–20 weight percent of a solution of sodium hydroxide in water, said weight percents of (a) and (b) being based upon the total weight of the caustic alkali silicate solution.

3. The foundry mix of claim 2 wherein the hydrated aluminum silicate also contains polyvinyl acetate that the amount of polyvinyl acetate is from 15 to 25 weight percent based upon the weight percent of the hydrated aluminum silicate.

4. The foundry mix of claim 3 wherein the hydrated aluminum silicate has an average particle size of less than 0.5 micron and the hydrated aluminum silicate contains from 2 moles water of hydration.

5. The foundry mix of claim 4 wherein the molar ratio of $Na_2O:Al_2O_3$ in the binder is from 0.7:1.0 to 1.5:1.0, the molar ratio of $Na_2O:SiO_2$ in the binder is from 0.2:1.0 to 0.3:1:0, and the molar ratio of $SiO_2:Al_2O_3$ in the binder is from 3.5:1.0 to 5.8:1.0.

6. A process for preparing a workable foundry shape comprising:
   (a) forming a foundry mix by mixing a foundry aggregate with a bonding amount of up to about 10 percent by weight, based upon the weight of the aggregate, of a binder system comprising:
      (1) caustic solution of sodium silicate, and
      (2) hydrated aluminum silicate, such that the weight percent of (1) in the binder ranges from about 60 to about 85 weight percent and the weight percent of (2) is from about 15 to about 40 weight percent, said weight percents being based upon the total weight of the binder,
   (b) shaping the foundry mix of (a) into a foundry shape;
   (c) contacting the foundry shape of (b) with a source of heat at a temperature of 200° C. to 300° C.; and
   (d) allowing the foundry shape to harden into a workable foundry shape.

7. The process of claim 6 wherein the caustic alkali silicate solution comprises (a) 80 to 95 weight percent of an aqueous sodium silicate solution, said aqueous sodium silicate solution comprises from 35 to 45 weight percent sodium silicate, said weight percent being based upon the total weight of the aqueous sodium silicate solution and (b) 5–20 weight percent of a solution of sodium hydroxide in water, said weight percents of (a) and (b) being based upon the total weight of the caustic alkali silicate solution.

8. The process of claim 7 wherein the hydrated aluminum silicate also contains polyvinyl acetate such that the amount of polyvinyl acetate is from 15 to 25 weight percent based upon the weight percent of the hydrated aluminum silicate.

9. The process of claim 8 wherein the hydrated aluminum silicate has an average particle size an average particle size of less than 0.5 micron, the hydrated aluminum silicate contains from 1–2 moles water of hydration, and the temperature at which the heating takes place is from 230° C. to 260° C.

10. A foundry shape prepared in accordance with claim 6.

11. A foundry shape prepared in accordance with claim 9.

12. The process of claim 12 wherein the molar ratio of $Na_2O:Al_2O_3$ in the binder is from 0.7:1.0 to 1.5:1.0, the molar ratio of $Na_2O:SiO_2$ in the binder is from 0.2:1.0 to 0.3:1.0, and the molar ratio of $SiO_2:Al_2O_3$ in the binder is from 3.5:1.0 to 5.8:1.0.

* * * * *